United States Patent

Camp

[11] Patent Number: 5,119,585
[45] Date of Patent: Jun. 9, 1992

[54] FISH HANDLING TOOL

[76] Inventor: Charles D. Camp, 261 Mudd St., Eastaboga, Ala. 36260

[21] Appl. No.: 568,048

[22] Filed: Aug. 16, 1990

[51] Int. Cl.⁵ .............................................. A01K 97/00
[52] U.S. Cl. .......................................... 43/53.5; 43/5; 294/115; 294/19.3
[58] Field of Search ................. 43/5, 53.5; 81/345; 294/19.3, 115

[56] References Cited

U.S. PATENT DOCUMENTS

| | | | |
|---|---|---|---|
| 406,546 | 7/1889 | Taber | 294/19.3 |
| 452,278 | 5/1891 | McIlvaine | 43/5 |
| 592,499 | 10/1897 | Stephens | 294/115 |
| 1,568,808 | 1/1926 | Davison | 294/115 |
| 1,580,416 | 4/1926 | Cromwell | 294/115 |
| 2,533,230 | 12/1950 | Dixon | 294/19.3 |
| 2,654,632 | 10/1953 | Herbert | 43/53.5 |
| 3,521,396 | 7/1970 | Allen | 43/53.5 |

FOREIGN PATENT DOCUMENTS 0087624 10/1935 Sweden .................. 294/19.3

Primary Examiner—Kurt Rowan
Attorney, Agent, or Firm—Fleit, Jacobson, Cohn, Price, Holman & Stern

[57] ABSTRACT

A tool for more effectively gripping and handling fish which includes a generally cylindrical tubular housing defining a handle having a hand grip thereon with a pair of pivotal gripping jaws actuated by a slidable sleeve that is spring biased away from the handgrip by two light coil springs to enable the sleeve to be retracted by the use of one finger or thumb of the hand which is used to grip the handgrip in order to open the jaws. The jaws, when open, are placed over the bottom lip of the fish and the sleeve is released with the light spring causing the jaws to grip the lip of the fish in order to lift the fish. The jaws include a pin and cam slot connection between the sleeve and jaws with the weight of the fish causing the jaws to more tightly grip the lip of the fish. The tubular housing includes a spring scale incorporated into the end thereof remote from the jaws which enables the user of the tool to weigh the fish without injury by supporting the tool and fish in suspended relation from a handle connected with a spring biased shaft having a graduated weight indicating scale thereon.

11 Claims, 2 Drawing Sheets

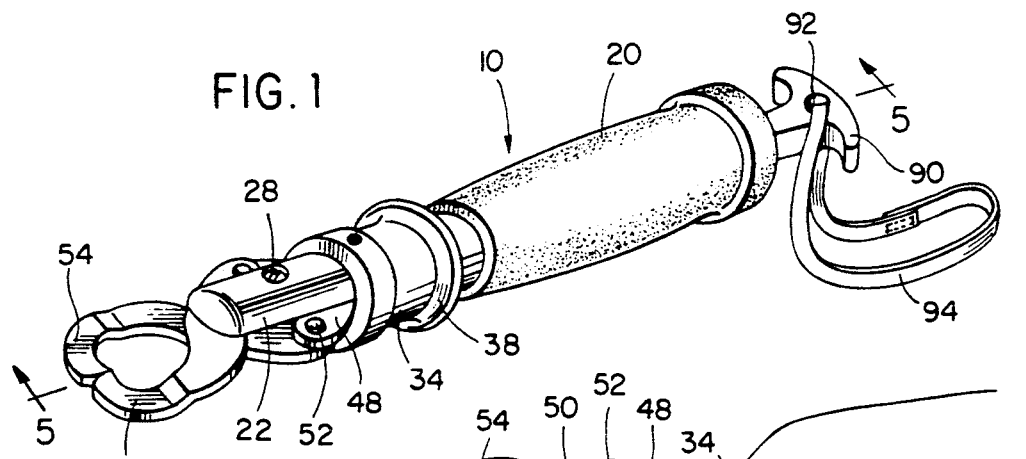
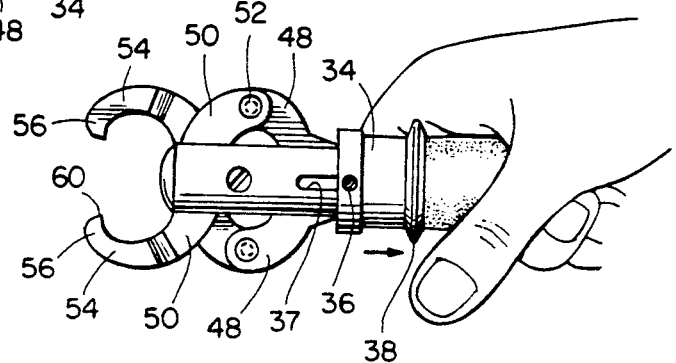
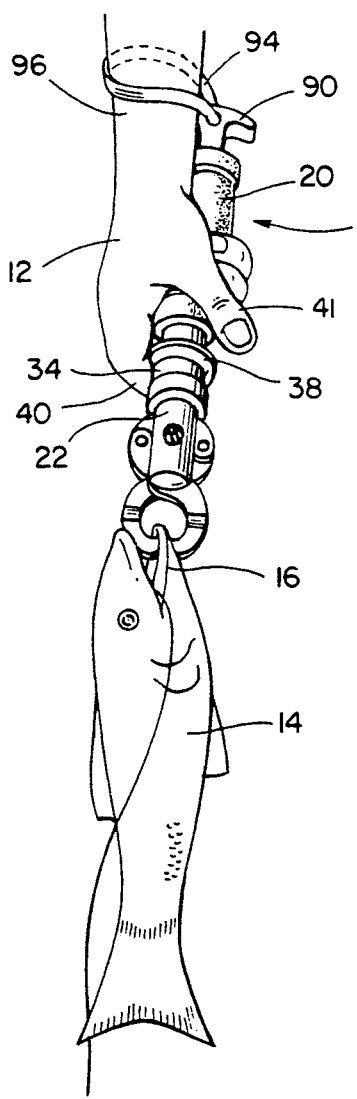
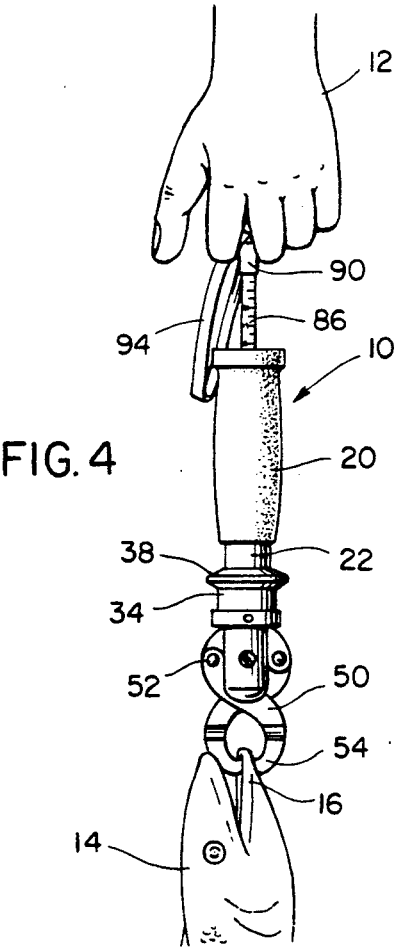

U.S. Patent   June 9, 1992   5,119,585
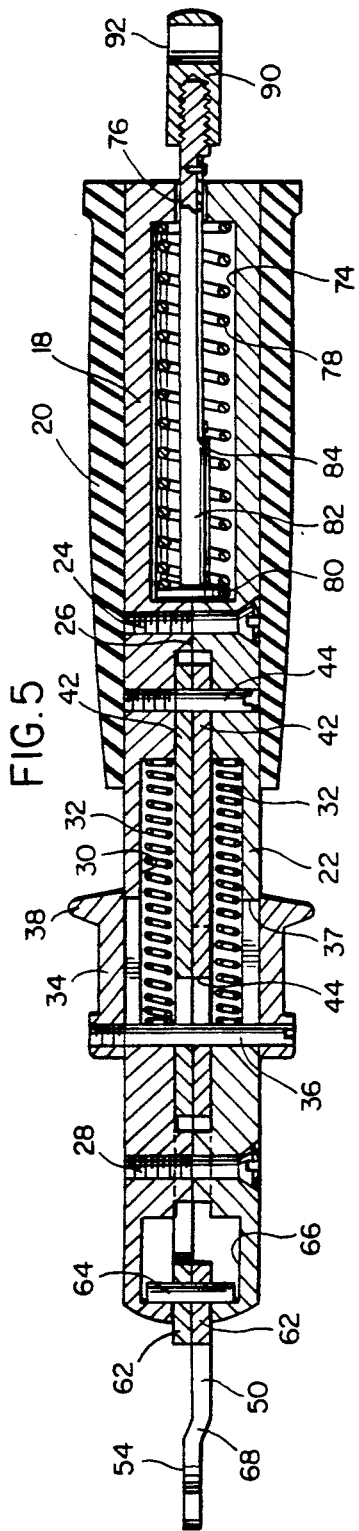
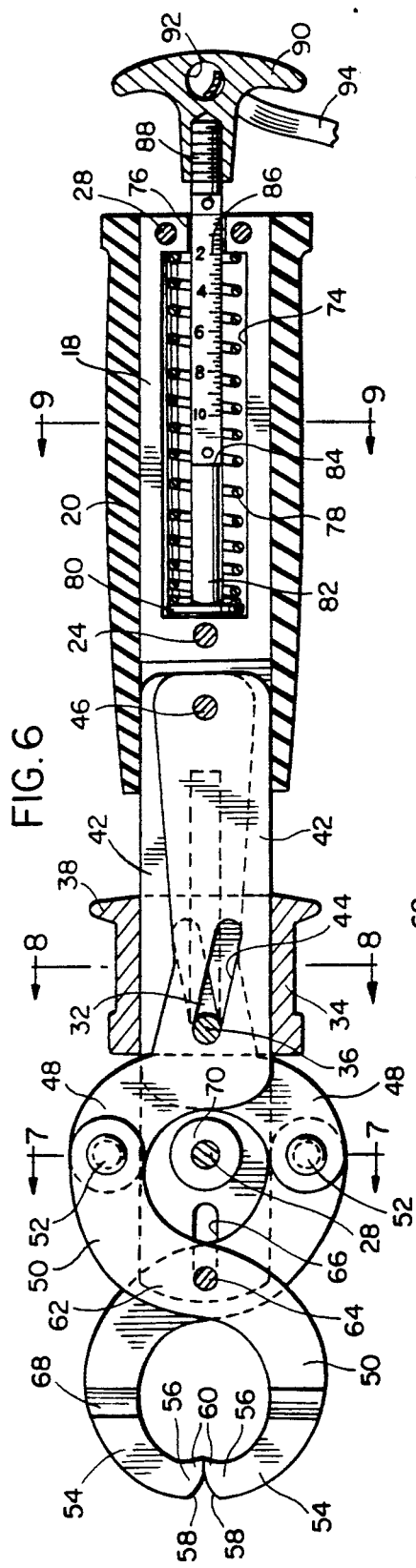
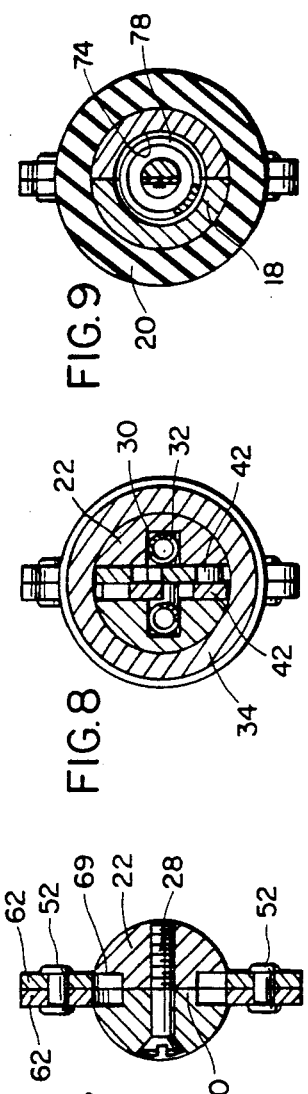
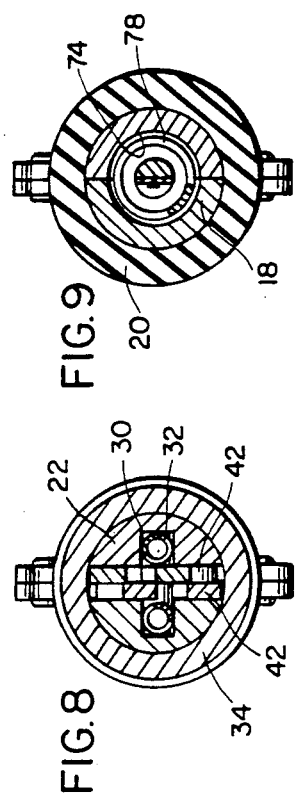

FISH HANDLING TOOL

BACKGROUND OF THE INVENTION

1. Field of the Invention

A tool for more effectively gripping and handling fish which includes a generally cylindrical tubular housing defining a handle having a handgrip thereon with a pair of pivotal gripping jaws actuated by a slidable sleeve that is spring biased away from the handgrip by two light coil springs to enable the sleeve to be retracted by the use of one finger or thumb of the hand which is used to grip the handgrip in order to open the jaws. The jaws, when open, are placed over the bottom lip of the fish and the sleeve is released with the light springs causing the jaws to grip the lip of the fish in order to lift the fish. The construction of the jaws and a pin and cam slot connection between the sleeve and jaws utilizes the weight of the fish, when suspended, to cause the jaws to more tightly grip the lip of the fish. The tubular housing includes a spring scale incorporated into the end thereof opposite to the jaws which enables the user of the tool to weigh the fish without injury.

2. Description of the Prior Art

Fish handling tools and gripping devices utilizing a pair of pivotal gripping jaws and manually actuated structures for moving the jaws between open and closed positions are generally well known. The following U.S. patents are relevant to this type of structure.

U.S. Pat. No. 1,056,343
U.S. Pat. No. 1,934,801
U.S. Pat. No. 3,018,579
U.S. Pat. No. 3,978,605
U.S. Pat. No. 4,547,989
U.S. Pat. No. 4,783,926

Some of the above listed prior patents grip the body of a fish and are more likely to injure a fish and U.S. Pat. No. 4,547,989 includes a weighing scale incorporated into a hook device in which it is necessary that the hook be placed through the lip of the fish.

None of the above patents disclose the specific structure of the jaws and the relationship between the actuating mechanism and the jaws arranged in association with a tubular housing or handle body as utilized in the present invention.

SUMMARY OF THE INVENTION

An object of the present invention is to provide a fish handling tool which provides for easier one hand operation of the jaws which enables a fisherman to utilize the fish handling tool by gripping it with one hand while the fisherman is holding a fishing rod or line in the other thereby facilitating secure gripping of the lower lip of the fish with the jaws being openable by using only one finger to move a sliding sleeve which will open the jaws to engage the jaws with a fish or when it is desired to release the fish.

Another object of the invention is to provide a fish holding tool which will provide an easier and more secure gripping function since it eliminates the necessity of a fisherman to continuously grip a fish holding device of conventional nature such as pliers in which the handles of the pliers must be continuously gripped in order to maintain a grip on the lip of the fish with this invention maintaining a positive grip on the lip of the fish without any gripping effort being exerted by the angler or fisherman regardless of the size of the fish since the weight of the fish serves to more firmly anchor the fish handling tool to the lip of the fish.

A further object of the invention is to provide a fish handling tool in which the weight of the fish adds to the amount of gripping pressure of the jaws on the lip of the fish thereby requiring the fisherman to exert only the effort necessary to lift the weight of the fish as well as the weight of the tool and eliminating the necessity of exerting a continuous gripping force such as is necessary when using pliers.

Still another object of the invention is to provide a fish handling tool which is self locking in which the mechanism keeps the jaws from opening until the angler or fisherman pulls back on the slidable sleeve which serves as a trigger to release the jaws with the tool including a wrist encircling strap to prevent loss of the tool.

Still another object of the invention is to provide a fish handling tool in accordance with the preceding objects in which a weighing scale is incorporated into the fish handling tool to facilitate an angler quickly determining the weight of the fish without injury to the fish and which assists in deciding whether the fish is to be kept or placed back in the water.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the fish handling tool of the present invention.

FIG. 2 is a fragmental plan view thereof illustrating the manner in which the sleeve can be moved longitudinally by the use of a single finger.

FIG. 3 is a perspective view of the fish handling tool of the present invention illustrating its use in supporting a fish with the lower lip between the jaws.

FIG. 4 is a fragmental side elevational view of the fish handling tool illustrating the scales in use.

FIG. 5 is a longitudinal, sectional view of the fish handling tool taken substantially upon a plane passing along section line 5—5 on FIG. 1 illustrating specific structural details of the tool.

FIG. 6 is a longitudinal, sectional view along a plane perpendicular to the plane of FIG. 5.

FIG. 7 is a transverse, sectional view taken substantially upon a plane passing along section line 7—7 on FIG. 6 illustrating the structural details of the jaws and associated structure.

FIG. 8 is a transverse, sectional view taken substantially upon a plane passing along section line 8-8 on FIG. 6 illustrating further structural details of the cam slots and pin connected with the slidable sleeve.

FIG. 9 is a transverse, sectional view taken substantially along a plane passing along section line 9-9 on FIG. 6 illustrating further structural details of the spring mechanism for biasing the jaws to closed position.

DESCRIPTION OF THE EMBODIMENT

The fish holding tool of the present invention is generally designated by reference numeral 10 and as illustrated in FIG. 3, the tool may be efficiently gripped and supported by a single hand 12 of an angler or fisherman for supporting a fish 14 in vertically suspended position in which the full weight of the fish is supported by the tool. As illustrated in FIG. 4, the tool 10 can be used to weigh the fish 14 without injury.

The tool 10 includes a tubular housing of generally cylindrical configuration as designated by reference numeral 18 with the housing including a handgrip 20 mounted thereon with the handgrip 20 being constructed of resilient material such as rubber, foam plastic or the like and secured to the tubular housing 18 or handle body by any suitable bonding techniques. The tubular housing 18 includes a tubular extension 22 rigid with the tubular housing 18 with the housing 18 and the extension 22 being split longitudinally as at 26 and secured in assembled relation by screw threaded fasteners 28. The tubular extension 22 includes a pair of longitudinal bores 30 therein each of which receives an elongated, light weight coil compression spring 32. A sleeve or trigger 34 is longitudinally slidably mounted on the exterior of the extension 22 and includes a transverse pin 36 extending diametrically across one end thereof with the pin 36 being rigidly affixed to the sleeve 34 adjacent its outer end with the other end of the sleeve 34 including a peripheral ridge or rib 38 thereon to facilitate it being moved longitudinally by engagement of the finger 40 or thumb 41 on the hand 12, as illustrated in FIG. 3, with the finger being able to retract the sleeve or trigger 34 by compressing the light springs 32 in the bores 30. The pin 36 extends through opposed longitudinal slots 37 in the extension 22 to enable movement of the trigger or sleeve 34.

Pivotally supported between the two halves of the tubular extension 22 is a pair of jaw actuators 42 in the form of rigid strap-like members each of which includes a cam slot 44 therein through which the pin 36 extends. The ends of the jaw actuators 42 are pivotally interconnected by a pivot screw or pin 46 which extends through the two halves of the extension 22 and the inner ends of the jaw actuators 42. The slots 44 are arranged in diverging relation from their forward end toward their rearward end in order for the pin 36 to cause the outer ends of the jaw actuating members 42 to move away from each other about pivot pin 46 when the sleeve or trigger 34 is retracted or moved to the right toward the tubular housing 18 and move toward each other when the sleeve on trigger 34 is moved to the left or toward the outer end of the tool.

Each of the jaw actuating members 42 includes a lateral extension 48 at the outer end with each of the extensions being arcuately curved as illustrated in FIGS. 1, 2 and 6. Pivotally attached to each of the arcuately curved lateral extensions 48 is a jaw 50 with each of the jaws 50 being generally of S-shaped configuration with one end of each jaw 50 being pivotally connected to a lateral extension 48 by pivot pin 52 with the pivot pins 5 being spaced apart corresponding with the spaced ends of the lateral extensions 48. The outer end of each of the jaws 50 are inturned as at 54 and provided with terminal gripping ends 56 which terminate in rounded outer corners 58 and pointed inwardly extending inner corners 60 for effectively gripping the lower lip 16 of a fish 14 as illustrated FIG. 3 without injury to the fish. Each of the jaws 50 includes a central portion 62 which cross over each other and are interconnected by a pivot pin 64 as illustrated in FIG. 5 which extends beyond the crossed portions 62 of the jaws 50 with the ends of the pin 64 being received in inwardly facing longitudinal grooves 66 formed in the interior surface of the two halves of the housing extension 22. Also each of the jaws includes an offset portion 68 which enables the terminal ends 56 of the jaws 50 to be oriented in the same plane even though the cross over portions 62 are in different planes as illustrated in FIG. 5.

As illustrated in FIG. 7, the cross over portion 62 of the jaws 50 are received in longitudinal grooves 69 in the facing portions of the housing extension 22 with the grooves defining central abutting shoulders 70. One of the assembling screws 28 extends through the half portions of the extension 22 and cooperates with the other screws 28 to retain the extension 22 and housing 18 in assembled relation. The housing or handle body 18 is also provided with a longitudinal bore 74 extending from the central portion of the housing to the end thereof opposite from the jaws 50. The outer end of the bore 74 is provided with a reduced diameter opening 76 to form a shoulder which is engaged by one end of a coil compression spring 78. The other end of the coil compression spring is engaged with a plate of piston 80 on the inner end of an elongated rod 82. A substantial length-wise portion of the rod 82 is provided with a flattened surface 84 on one side thereof provided with graduated indicia 86 including numerals to indicate the weight or force required to move the rod 82 outwardly in order for the graduated scale 86 to be observed at the end of the housing 18. The outer end of the rod 82 is provided with a screw threaded end portion 88 having a handle 90 mounted thereon by which the tool 10 can be supported by the hand 12 gripping the handle 90 as illustrated in FIG. 4 in order to weigh a fish 14. When doing this, the tool will not injure the fish and the angler can note and record the weight of the fish and return the fish into the water if the angler does not want to keep the fish or if the fish is below the weight limit. The handle 90 is provided with a central aperture 92 which receives a wrist strap 94 which encircles the wrist area 96 of the hand 12 of the angler. This provides a safety feature to prevent accidental loss of the tool 10 overboard when gripping a fish as it is being landed and also keeps the tool in accessible position for use by retaining the tool in close proximity to the hand.

When using the fish handling tool of the present invention, it is held by the angler by gripping the handgrip 20 on the housing 18 as illustrated in FIG. 3. The angler or fisherman can use the forefinger 40 on the hand 12 or the thumb if desired in order to pull the trigger sleeve 34 toward the scale end of the tool. As the trigger sleeve 34 is pulled toward the scale end, the transverse pin 36 connected to the trigger sleeve 34 is moved in the diverging scissor slots 44 in the jaw actuators 42 thus moving the jaw actuators 42 outwardly about pivot pin 46 which connect the inner ends thereof to the housing extension 22. Thus, the outer ends of the jaw actuating members 42 with the extensions 48 are moved outwardly along with the pivot pins 52. Outward movement of the pivot pins 52 causes pivotal movement of the jaws 50 about pivot pin 64 which moves longitudinally inwardly of the grooves 66 as the jaws 50 move to open position with the jaw tips 56 moving away from each other from the position illustrated in FIG. 6 to the open position as illustrated in FIG. 2. When the jaw tips 56 are spaced apart, they are placed over the bottom lip 16 of the fish 14 and the trigger sleeve 34 is released. The trigger sleeve 34 is forced toward the jaw end of the tool by the trigger sleeve springs 32 which exert force on the transverse pin 36. This movement of the trigger sleeve pin 36 forces the scissor slots 44 in the jaw actuating members 42 to move the outer ends of the jaw actuating members 42 and the extensions 48 as well as the pivot pins 52 back toward the center line of the fishing tool thus moving the jaw tips 56 towards each other thereby snugging the jaw tips 56 into gripping engagement with the lower lip 16 of the fish 14. The springs 32 keeping the jaw tips 56 from opening due to a lack of leverage at the jaw tips on the trigger sleeve pin 36 which extends through the slots 44. As the fish 14 is lifted, the jaw pivot pin 64 is being pulled away from the pivot pin 46 for the jaw actuating members by the weight of the fish 14 and this movement causes the outer ends of the jaw actuating members 42 and the lateral extensions or arms 48 along with the pivot pins 52 to move back toward the center line of the fish handling tool thereby causing the jaw tips 56 to grip tighter on the lower lip 16 of the fish 14.

Gripping a fish by its lower lip with this fish handling tool enables the fish to be easily separated from the hook on which the fish is caught and weighed without injury to the angler which can occur when grasping a fish in the hand and without injury or contamination to the fish by grasping by hand or coming in contact with contaminated surfaces. When it is desired to weigh the fish, the angler or fisherman can slide hand 12 upwardly into gripping engagement with the handle 90 as illustrated in FIG. 4 with the graduated scale 86 being observable at the upper end of the housing 18 thus indicating the weight of the fish without injury.

This invention provides substantial improvements as compared to the use of pliers which is one conventional way of handling fish and also provides various advantages over the use of pliers as well as gaff hooks, tail lassos, nets and other arrangements normally used for handling fish. When using pliers, it is necessary that the pliers which are gripped in one hand while the fishing rod or line is held in the other hand exert constant gripping pressure on the lip of the fish. With this invention, easier one-hand opening of the jaws is accomplished by providing a secure and comfortable grip with only one finger being used to open the jaws and to permit the jaws to grip the lower lip of the fish. This eliminates the necessity of the user of pliers to exert a constant gripping force or pressure in order to maintain the gripping function of the pliers. When using pliers in this manner, the grip on the fish, fishing rod or line may be lost especially if a large fish is being held and the fish flops or jumps. The weight of the fish maintains a tight grip and actually increases the grip on the fish and provides a self-locking mechanism that will keep the jaw from opening until the angler pulls back on the trigger sleeve 34.

The present invention also contemplates an elongated embodiment of the fish handling tool for use aboard boats and when handling larger fish. This enables the tool to be supported by grasping the handle 90 which enables the jaws and body to swivel or spin about a longitudinal axis and the scale spring 78 provides a shock absorber or resilient cushion between the handle 90 and the remainder of the tool. In this construction, the trigger sleeve 34 would be connected to the pin 36 by an elongated central rod received in a bore or other passageway in the tool thereby enabling the sleeve to be positioned adjacent the handle 90 to enable one handed operation of the tool.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A fish handling tool comprising a longitudinally extending housing having a handle incorporated thereon by which the housing can be handled, a pair of jaws mounted on and extending axially from one end of the housing, said jaws including inturned tips for clampingly engaging the lower lip of a fish, means mounting the jaws from the end of the housing, said mounting means including a pair of pivotal jaw mounting means pivotally connected to the housing for pivotal movement about a transverse axis with such pivotal movement moving the jaw tips toward and away from each other, and movable means mounted on the housing and engaged with the pivotal jaw mounting means to pivot the jaw mounting means towards and away from each other thus moving the jaw tips towards and away from each other, each jaw mounting means including an actuating member having one end pivotally attached to the housing, the other end of the actuating member having a laterally extending end portion, means pivotally connecting the end portions of the actuating members to the jaws and means pivotally interconnecting the jaws in spaced relation to the jaw tips and in spaced relation to the laterally extending end portions of the jaw actuating members, each of said jaws being generally of S-shape with the central portion of each of the jaws being disposed in overlying crossed relation and a pivot pin interconnecting the crossed portion of the jaws, said pivot pin interconnecting the crossed portions of the jaws being disposed in a longitudinal guide in the housing to enable longitudinal movement of the pivotal connection between the jaws in relation to the housing, said means for moving the jaw mounting means including a slidable sleeve on the housing, each of said jaw mounting means including an angled longitudinal slot with the slots being in overlying registry at one end thereof when the jaw tips are closed with the remainder of the slots being disposed in diverging relation, a transverse pin on said sleeve extending through said slots to move the jaw mounting means pivotally in response to longitudinal movement of the sleeve.

2. The structure as defined in claim 1 wherein spring means interconnects the sleeve and housing to bias the sleeve to a position with the jaw tips in closed position.

3. The structure as defined in claim 2 wherein said housing includes a longitudinally elongated hand grip forming the handle, said sleeve including a projection on the periphery thereof to enable a person holding the tool to engage and move the sleeve against the spring by the use of a single finger or thumb to move the sleeve toward a position for opening the jaw tips thereby enabling the tool to be grippingly engaged with the lower lip of a fish by a user employing a single hand.

4. The structure as defined in claim 3 wherein said housing includes a longitudinal bore in the end thereof remote from the jaws, spring scale means incorporated into said bore and projecting axially from the housing, handle means on said spring scale means to be grasped by an angler to enable the spring scale means to indicate the weight of the fish without injury.

5. The structure as defined in claim 4 wherein said spring scale means includes a compression coil spring mounted in the bore, a shaft extending longitudinally through the spring with one end connected to the inner end of the spring with the shaft extending outwardly of the axial end of the housing, said shaft including a graduated scale associated with the end of the housing to indicate the distance that the spring has been compressed thereby indicating the weight of a fish, said handle means being mounted on said shaft.

6. The structure as defined in claim 5 wherein said handle means on the spring scale means includes a flexible wrist encircling strap connected thereto to prevent loss of the tool and maintain the tool in accessible position.

7. A gripping tool for one handed use by a user when gripping, picking up and releasing an item, said tool comprising an elongated housing having a handle means thereon, a pair of jaws having overlapping crossed central portions, means pivotally connecting the central crossed portions of said jaws and pivotally connecting the jaws to the housing at one end thereof, longitudinally movable means mounted on the housing in adjacent relation to the handle means to enable a user to engage and move the movable means longitudinally by the use of the forefinger or thumb, the jaw actuating means interconnecting the jaws, movable means, and housing to open and close the jaws in response to longitudinal movement of the movable means, said jaw actuating means including a pair of jaw actuating members extending longitudinally of the housing, one end of each member being pivotally connected to the housing in remote relation to the jaws, the other end of each member being pivotally connected to one end of a corresponding jaw, the other end of each jaw extending toward each other for gripping an object when the jaws are pivoted in one direction, said jaw actuating means also including means interconnecting the movable means on the housing and said jaw actuating members to pivot the jaw actuating members in response to longitudinal movement of said movable means to open and close the jaws, said longitudinally movable means mounted on the housing including a trigger sleeve longitudinally slidable on the housing, said sleeve being positioned adjacent the handle means and spring means biasing the sleeve toward jaw closing position, said means interconnecting the sleeve and jaw actuating members including a pin rigidly mounted on said sleeve, each of said jaw actuating members including a longitudinally extending slot in inclined relation to the longitudinal axis of the member, said slots being in registry and inclined in opposite directions, said pin on said sleeve extending through said registered slots to pivot the jaw actuating members and jaws in response to longitudinal movement of the sleeve.

8. The gripping tool as defined in claim 7 wherein said housing, handle means and sleeve are of generally cylindrical configuration with the pin extending diametrically of the sleeve and through said slots, said slots being inclined oppositely with an included angle that will prevent the jaws from pivoting toward open position when outward force is exerted on the ends of the jaws outwardly of the pivotal connection between the jaws.

9. The gripping tool as defined in claim 8 wherein said housing includes opposed longitudinal slots slidably receiving the diametric pin on the sleeve and opposed guide means longitudinally movably receiving the means pivotally connecting the jaws to the housing whereby axial force exerted by the weight of an object being picked up or suspended will be transferred to the housing through the jaw actuating members and their pivotal connection to the housing remote from the jaws.

10. A gripping tool for one handed use by a user when gripping, picking up and releasing an item, said tool comprising an elongated housing having a handle means thereon, a pair of jaws having overlapping crossed central portions, means pivotally connecting the central crossed portions of said jaws and pivotally connecting the jaws to the housing at one end thereof, longitudinally movable means mounted on the housing in adjacent relation to the handle means to enable a user to engage and move the movable means longitudinally by the use of the forefinger or thumb on a hand engaged with said handle means, a pair of jaw actuating members extending longitudinally of the housing, pivot means connecting one end of each member to the housing in remote relation to the jaws in a manner to prevent relative longitudinal movement between the jaw actuating members and the housing, the other end of each member being pivotally connected to one end of a corresponding jaw, the other end of each jaw extending toward each other from gripping an object when the jaws are pivoted in one direction, and means interconnecting the movable means on the housing and said jaw actuating members to pivot the jaw actuating members in response to longitudinal movement of said movable means to open and close the jaws.

11. The gripping tool as defined in claim 10 wherein said longitudinally movable means mounted on the housing includes a trigger sleeve longitudinally slidable on the housing, said sleeve being positioned adjacent the handle means and spring means biasing the sleeve toward jaw closing position, said means interconnecting the sleeve and jaw actuating members including cam means interconnecting the sleeve and said jaw actuating members to pivot the jaw actuating members and jaws in response to longitudinal movement of the sleeve.

* * * * *